(12) United States Patent
Eschbach et al.

(10) Patent No.: US 7,721,204 B2
(45) Date of Patent: *May 18, 2010

(54) CLIENT DEPENDENT IMAGE PROCESSING FOR BROWSER-BASED IMAGE DOCUMENT VIEWER FOR HANDHELD CLIENT DEVICES

(75) Inventors: Reiner Eschbach, Webster, NY (US); Emil V. Rainero, Penfield, NY (US)

(73) Assignee: Xerox Corporation, Norwalk, CT (US)

( * ) Notice: Subject to any disclaimer, the term of this patent is extended or adjusted under 35 U.S.C. 154(b) by 270 days.

This patent is subject to a terminal disclaimer.

(21) Appl. No.: 10/901,240

(22) Filed: Jul. 29, 2004

(65) Prior Publication Data

US 2006/0026513 A1 Feb. 2, 2006

(51) Int. Cl.
*G06F 17/00* (2006.01)
(52) U.S. Cl. .................. 715/273; 715/242; 715/255; 715/234; 382/232; 382/276; 382/254; 709/202; 709/203
(58) Field of Classification Search .................. 715/500, 715/501.1, 530, 523, 273, 242, 255, 234; 358/1.15; 382/232, 276, 254; 709/202, 203
See application file for complete search history.

(56) References Cited

U.S. PATENT DOCUMENTS

| 5,157,740 | A |   | 10/1992 | Klein et al. |
| 5,210,824 | A |   | 5/1993 | Putz et al. |
| 5,450,502 | A |   | 9/1995 | Eschbach et al. |
| 5,581,370 | A |   | 12/1996 | Fuss et al. |
| 5,703,965 | A |   | 12/1997 | Fu et al. |
| 5,872,569 | A | * | 2/1999 | Salgado et al. .............. 715/764 |
| 5,883,979 | A |   | 3/1999 | Beretta et al. |
| 5,963,201 | A | * | 10/1999 | McGreggor et al. ......... 715/722 |
| 6,128,021 | A |   | 10/2000 | Van Der Meulen et al. . 345/428 |
| 6,175,427 | B1 |   | 1/2001 | Lehmbeck et al. |
| 6,222,642 | B1 |   | 4/2001 | Farrell et al. |
| 6,240,215 | B1 |   | 5/2001 | Salgado et al. |
| 6,314,452 | B1 |   | 11/2001 | Dekel et al. .................. 709/203 |
| 6,343,313 | B1 |   | 1/2002 | Salesky et al. |
| 6,345,128 | B1 |   | 2/2002 | Stokes |
| 6,449,639 | B1 |   | 9/2002 | Blumberg .................... 709/217 |
| 6,456,340 | B1 |   | 9/2002 | Margulis |
| 6,469,805 | B1 | * | 10/2002 | Behlok ........................ 358/1.9 |

(Continued)

FOREIGN PATENT DOCUMENTS

GB        2 343 807 A        5/2000

(Continued)

OTHER PUBLICATIONS

S. Deshpande et al.; "HTTP Streaming of JPEG2000 Images;" Sharp Laboratories of America; Camas, WA 98607; 2001 IEEE; pp. 15-19.

(Continued)

*Primary Examiner*—Stephen S Hong
*Assistant Examiner*—Matthew J Ludwig
(74) *Attorney, Agent, or Firm*—Oliff & Berridge, PLC

(57) ABSTRACT

Methods and systems that dynamically control and/or direct document image processing based on one or more of client device display capabilites, image formats supported by the client device, network bandwidth, document file format, document content and user hints.

28 Claims, 6 Drawing Sheets

U.S. PATENT DOCUMENTS

| | | | |
|---|---|---|---|
| 6,484,631 B2 | 11/2002 | Degani et al. | |
| 6,501,472 B1 | 12/2002 | Hunt et al. | |
| 6,538,661 B1 | 3/2003 | Farnung et al. | |
| 6,539,547 B2 | 3/2003 | Driscoll, Jr. et al. | 725/91 |
| 6,594,687 B1 | 7/2003 | Yap et al. | |
| 6,606,418 B2 | 8/2003 | Mitchell et al. | |
| 6,618,171 B1 | 9/2003 | Tse et al. | |
| 6,628,843 B1 | 9/2003 | Eschbach et al. | |
| 6,662,218 B2 | 12/2003 | Migdoll et al. | |
| 6,708,309 B1 | 3/2004 | Blumberg | 715/530 |
| 6,742,043 B1 | 5/2004 | Moussa et al. | |
| 6,754,231 B1 | 6/2004 | Jonsson et al. | |
| 6,826,310 B2 | 11/2004 | Trifonov et al. | |
| 6,874,131 B2 * | 3/2005 | Blumberg | 715/513 |
| 6,944,357 B2 | 9/2005 | Bossut et al. | |
| 6,963,668 B2 * | 11/2005 | Engeldrum et al. | 382/233 |
| 6,970,602 B1 | 11/2005 | Smith et al. | |
| 6,983,083 B2 | 1/2006 | Fedorovskaya et al. | |
| 7,031,534 B2 | 4/2006 | Buckley | |
| 7,065,255 B2 | 6/2006 | Chen et al. | |
| 7,218,789 B2 | 5/2007 | Faber et al. | |
| 7,257,771 B2 | 8/2007 | Buser et al. | |
| 7,574,653 B2 | 8/2009 | Croney et al. | |
| 2001/0035979 A1 | 11/2001 | Pornbacher | 358/400 |
| 2002/0056010 A1 | 5/2002 | Lincoln et al. | |
| 2002/0085233 A1 | 7/2002 | Degani et al. | |
| 2002/0087728 A1 | 7/2002 | Deshpande et al. | |
| 2002/0107988 A1 | 8/2002 | Jordan | |
| 2002/0112114 A1 | 8/2002 | Blair et al. | |
| 2003/0018818 A1 | 1/2003 | Boliek et al. | |
| 2003/0053690 A1 | 3/2003 | Trifonov et al. | |
| 2003/0135649 A1 | 7/2003 | Buckley et al. | |
| 2004/0045030 A1 | 3/2004 | Reynolds et al. | |
| 2004/0146206 A1 | 7/2004 | Matsubara | |
| 2005/0125352 A1 * | 6/2005 | Hirst | 705/50 |
| 2005/0188112 A1 | 8/2005 | Desai et al. | |
| 2005/0244060 A1 * | 11/2005 | Nagarajan et al. | 382/232 |
| 2005/0271283 A1 | 12/2005 | Dekel et al. | |

FOREIGN PATENT DOCUMENTS

| | | |
|---|---|---|
| WO | WO 00/24188 | 4/2000 |
| WO | WO 00/72517 A1 | 11/2000 |
| WO | WO 00/75859 A1 | 12/2000 |
| WO | WO 00/77741 A1 | 12/2000 |
| WO | WO 01/54397 A2 | 7/2001 |
| WO | WO 01/63558 A2 | 8/2001 |

OTHER PUBLICATIONS

A. Pulsifer; "Advanced Imaging JPEG 2000 Has Arrived;" Advanced Imaging; May 2001; 4 pages.
Steve Putz, "Design and Implementation of the System 33 Document Service", Xerox Corporation.
U.S. Appl. No. 10/901,241, filed Jul. 29, 2004; Rainero et al.
U.S. Appl. No. 10/901,333, filed Jul. 29, 2004; Eschbach et al.
Jan. 22, 2010 Office Action issued in U.S. Appl. No. 11/548,896.

* cited by examiner

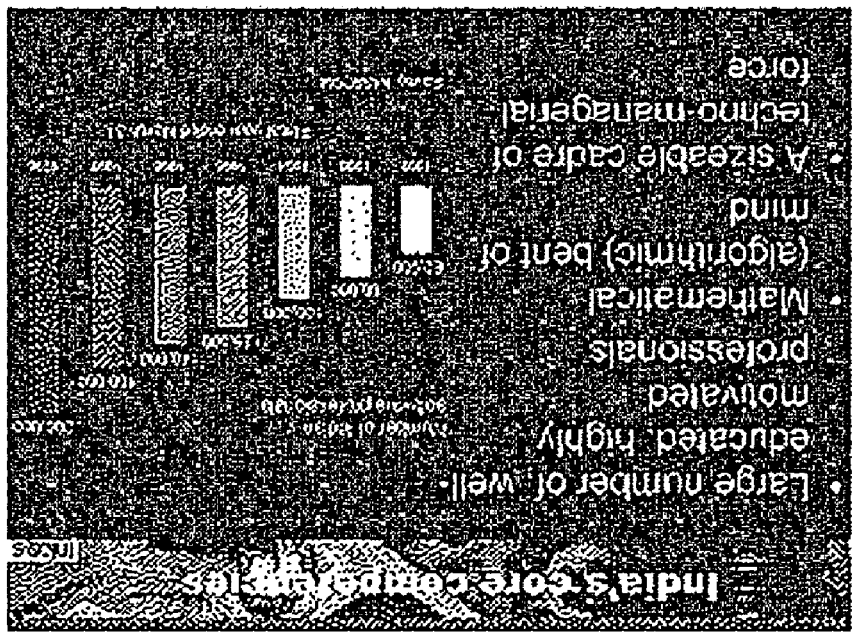
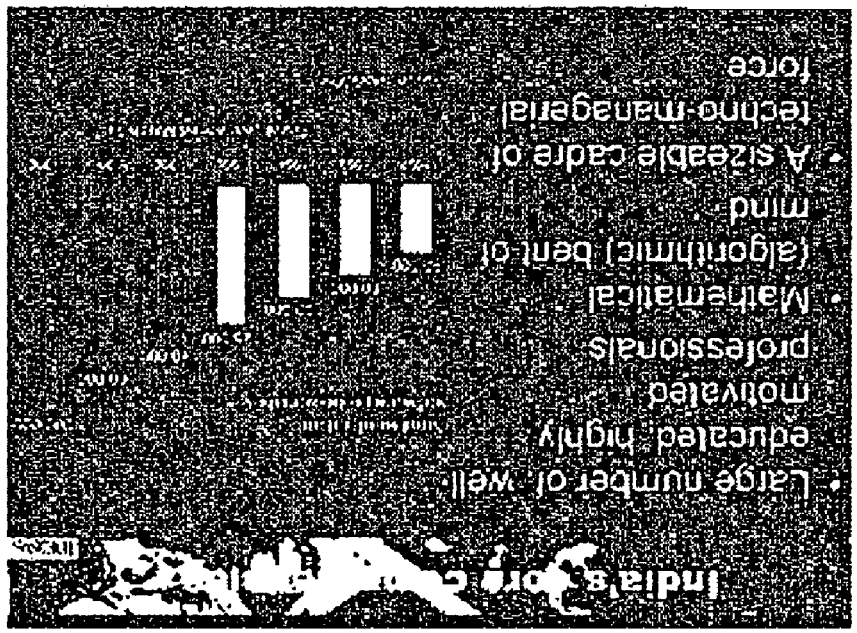
FIG. 5

US 7,721,204 B2

CLIENT DEPENDENT IMAGE PROCESSING FOR BROWSER-BASED IMAGE DOCUMENT VIEWER FOR HANDHELD CLIENT DEVICES

BACKGROUND OF THE INVENTION

1. Field of Invention

This invention relates to image processing as a function of the image viewing client device.

2. Description of Related Art

A user typically likes to view a document on a handheld wireless device before deciding to print, facsimile or e-mail the document. A handheld wireless device, such as, for example, a personal digital assistant (PDA), a cellular phone or a miniaturized computing device, has relatively little screen surface area for viewing documents, as well as little memory for storing the document or the applications for all the document formats a user can conceivably access and view.

Current solutions either restrict the document types that can be viewed on handheld client devices, e.g., web pages with graphics interchange format (GIEF) files, show only the ASCII text of the document, provide viewers for a small set of document types, or do not provide viewers at all. In these current solutions, the documents can exist on the handheld client device, a server, e.g., mail server, or any document file/management system in their environment. Generally, documents that do not reside on the handheld client device are typically too large to quickly and/or efficiently transmit over today's wireless networks.

SUMMARY OF THE INVENTION

A large portion of the information present in typical documents may be "best" retrieved by using the document image, i.e.: the visual representation, rather than the ASCII representation of the information. This approach is obvious for scanned data, where no ASCII representation is available unless OCR has been additionally performed. However, using the document image to retrieve information in the document may also extend to spreadsheets, where the spatial organization is important; letterheads for telephone numbers, dates, and other contact data; and PowerPoint presentation slides, where almost all information is spatially organized; and the like. Any graphic, table, picture or drawing has an important spatial organization, which can be seen from the two pages 11 and 12 of an example patent document 10 in FIG. 1.

Generally, the document has to be represented on a small screen of the handheld client device, such as, for example, 96×40, 160×160 or 240×320 pixels. Here, the exact number of pixels is of lower importance, what is important that the physical and pixel-wise dimensions of the display are smaller than the dimensions commonly used on workstations and the like. One approach is to scale the document page image to the client device screen, and, on zooming, scale the appropriate document image regions to the screen. When displaying images on a small screen of a handheld wireless device, an obvious trade-off has to be made between image quality and transmission speed.

This invention provides methods and systems that replace the image scaling approach above with client dependent image processing that is a function of at least one or more of a client device parameter, data transmission capability, document type and/or format, and user input.

This invention provides methods and systems that create image views of documents that can be used for document identification and data retrieval on handheld client devices.

In various exemplary embodiments, this invention provides methods and systems that actively modify processing parameters of an image as a function of the image viewing client.

In various exemplary embodiments, this invention provides methods and systems that dynamically control and/or direct document image processing based on client device display capabilities, image formats supported by the client device, network bandwidth, document file format, document content, user hints and the like.

These and other features and advantages of this invention are described in, or are apparent from, the following detailed description of various exemplary embodiments of the systems and methods according to this invention.

BRIEF DESCRIPTION OF THE DRAWINGS

Various exemplary embodiments of the systems and methods of this invention will be described in detail, with reference to the following figures, wherein:

FIG. 2 illustrates an exemplary embodiment of a system topology that the systems and methods of this invention are usable with;

FIG. 5 illustrates an example of the type of image quality that may be obtained by various exemplary embodiments of the client-based image processing methods and systems according to this invention.

DETAILED DESCRIPTION OF PREFERRED EMBODIMENTS

Various exemplary embodiments of systems and methods according to this invention relate to client dependent image processing for browser-based image document viewer for handheld client devices.

Figure 2:
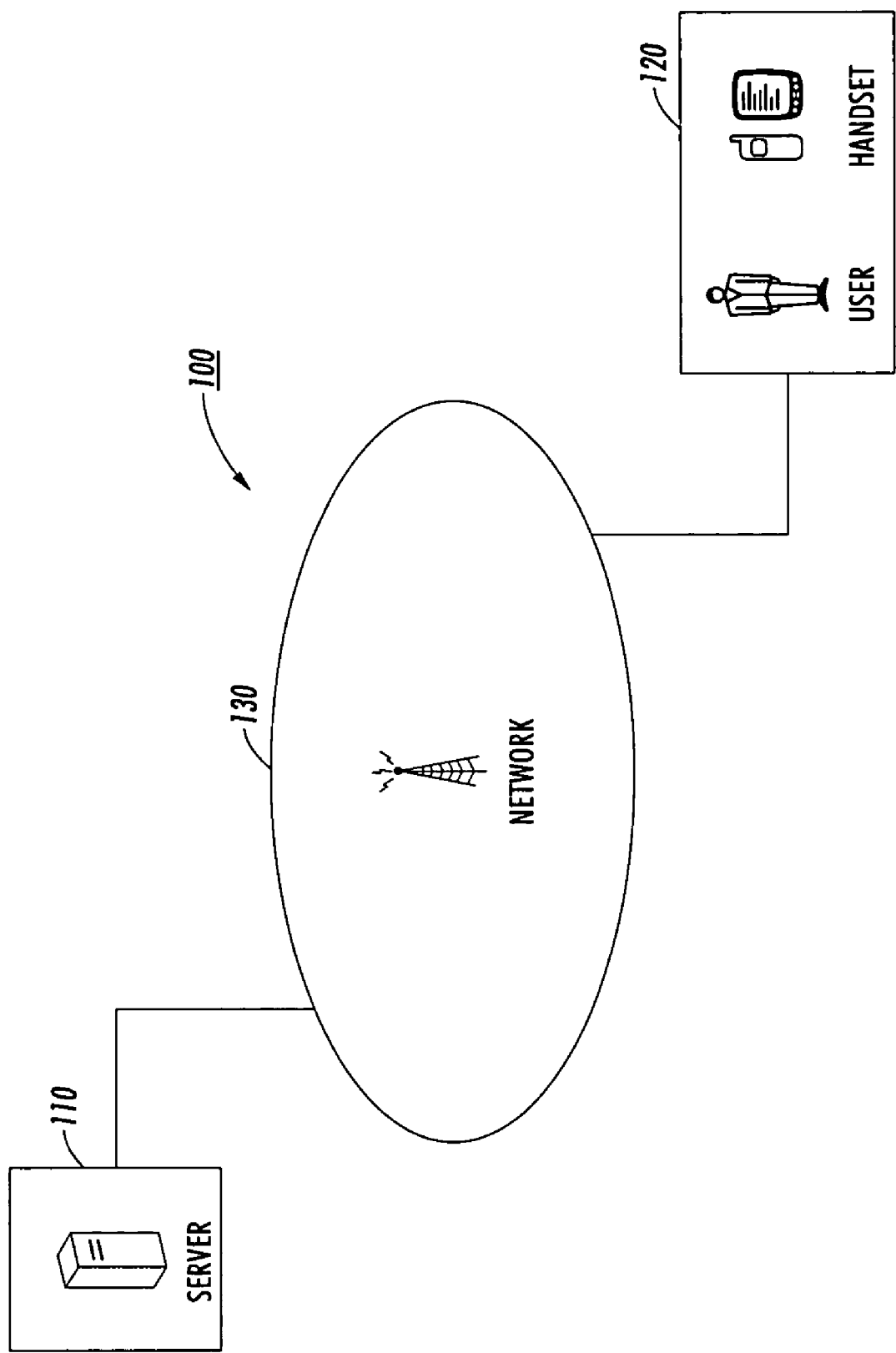

FIG. 2 shows one exemplary embodiment of a system topology 100 associated with image processing according to this invention. As shown in FIG. 2, the system 100 includes one or more servers 110 connected to one or more clients 120 via one or more networks 130.

The server 110 processes image data of a document based on one or more of client-based parameters, transmission network capability, document type and user input requests. The server 110 then compresses the processed data, and transmits the compressed data to the client 120 by way of the network 130.

In various exemplary embodiments, the server 110 receives requests from the client 120 for processing image data and transmitting processed image data back to the client 120. In various exemplary embodiments, the server 110 processes the image data based on a selection of parameters prestored at the server 110 regarding the capabilities or requirements of the client 120 and the network 130. In various other exemplary embodiments, the server 110 processes the image data based on the selection of parameters detected from the client 120, the network 130, or a combination thereof.

In various exemplary embodiments, the server 110 processes the image data based on client device/handset display capabilities, image formats supported by the client device/handset, network bandwidth, document file format, document content, user hints and the like. In various other exemplary embodiments, the server 110 receives the selection of parameters sent from the client 120, based on various user inputs.

As part of the client-dependent image processing operations, the server 110 also compresses the processed image data before transmitting the image data to client 120. In various exemplary embodiments, the server 110 compresses the processed image data using custom color maps, as described in detail in U.S. patent application Ser. No. 10/901,333, now U.S. Pat. No. 7,539,341, entitled "System and Methods for Processing Image Data Prior to Compression", which is incorporated herein by reference in its entirety.

The server 110 is generally associated with a computer, as described in greater detail below in connection with FIG. 6. The client 120 is a device that can display a form of the processed and compressed image data. The client 120 receives the processed and compressed image data from the server 110 via the network 130. In various exemplary embodiments, the client 120 sends a request for the image data to the server 110 before receiving the processed and compressed data. In various exemplary embodiments, the client 120 selects and sends one or more parameters to the server 110 as a condition for the server 110 to process the data before processing the data.

In various exemplary embodiments, the client 120 is a mobile device, such as a laptop computer, a personal data assistant (PDA), a cellular phone, an electronic computing graphics tablet-like device or other handheld computing device and the like.

The network 130 transmits data, requests or other information between the server 110 and the client 120. In various exemplary embodiments, the network 130 is a wired network. In various other exemplary embodiments, the network 130 is a wireless network. In various other exemplary embodiments, the network 130 includes both wired and wireless networks. In various exemplary embodiments, the network 130 includes the Internet. A user may view processed data on a web page displayed on the client 120. In various other exemplary embodiments, the network 130 includes a wireless cellular phone network or any other existing or yet to be invented communication network. A user may view the processed data displayed on a cellular phone at the client 120.

It will be noted that the following discussion does not discuss in detail all the client-dependent image processing operations that may be performed, or that are possible, according to various exemplary embodiments of systems and methods of this invention. The image processing operations/effects that are discussed below are well known in the art and are relatively straight forward. For example, if the client only supports GIF image formats, only those files will be created. Other image processing operations/effects, such as, for example, crop windows, image orientation, and the like, may also be practiced according to various exemplary embodiments of the systems and methods of this invention.

Figure 3:
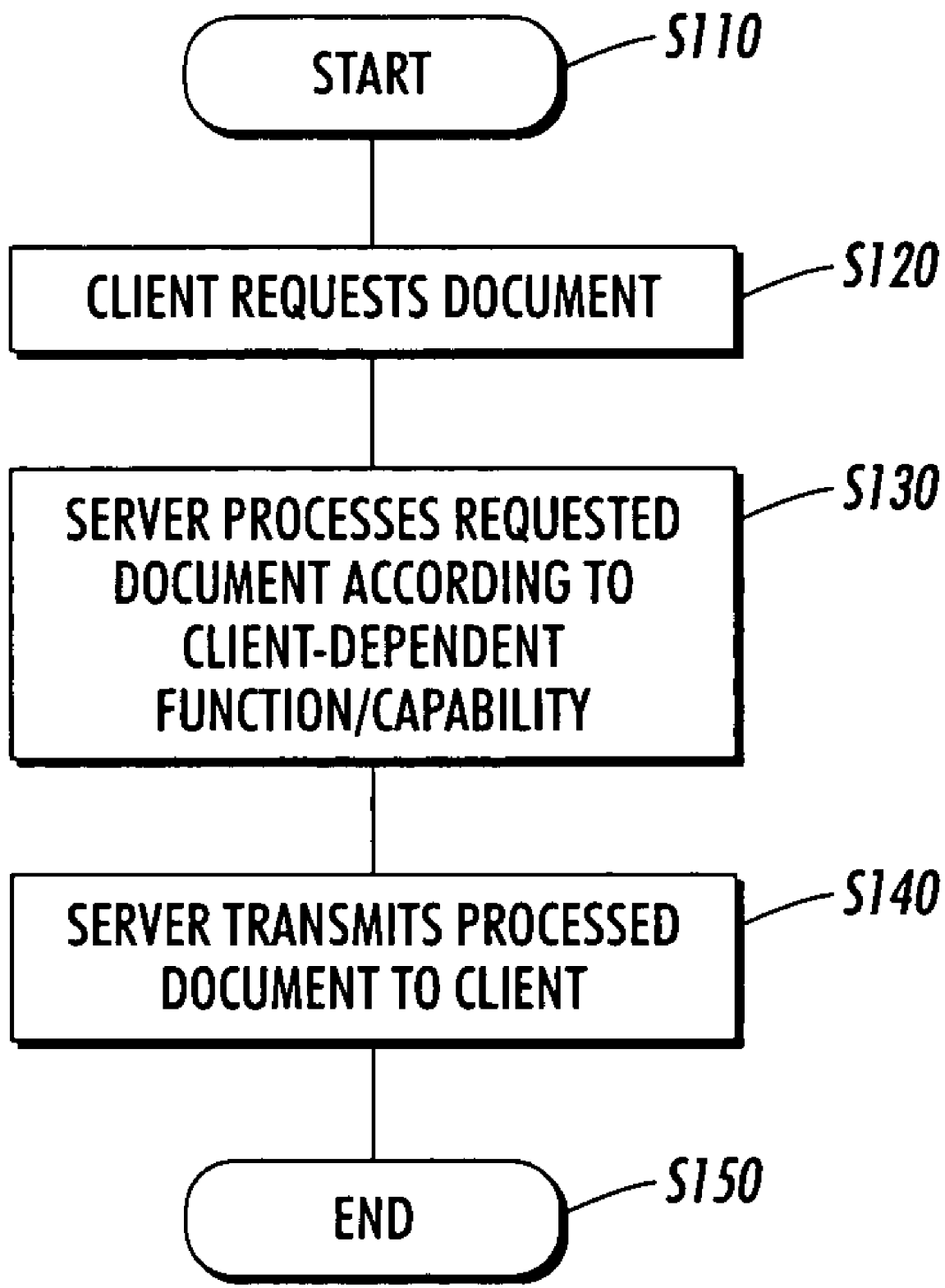
FIG. 3 is a flowchart outlining one exemplary embodiment of a method for processing data according to this invention.

FIG. 3 is a flowchart outlining one exemplary embodiment of a method for processing data according to this invention. As shown in FIG. 3, the image processing components that are influenced by client data and that will be described in subsequent sections. It is obvious that the client dependent image processing will lead to a different image processing of the same page/document if viewed by two different client devices (clients) having different capabilities or attributes. It should also be noted that two different documents will undergo different image processing even for the identical client based on document attributes. It is this second aspect that the various exemplary embodiments of the methods and systems according to this invention will discuss in detail below.

As shown in FIG. 3, beginning in step S110, operation of the method continues to step S120, where a server receives a request for a document from a client via a network. In various exemplary embodiments, the request is a signal generated when a user clicks an icon/link displayed at the client. The icon/link represents document data to be processed.

Next, in step S130, the server processes the document data. The document data may be processed based on one or more of client device/handset display capabilities, image formats supported by the client device/handset, network bandwidth, document file format, document content, user hints and the like.

Following the processing of the document data, at step S140, the client-dependent processed data is transmitted to the client device for display on the client device. Then, operation of the method continues to step S150 where the operation stops. It should be noted that all standard methods of anticipating user requests can be performed on the server, based on configuration, load, etc., thereby reducing the latency for subsequent requests without altering the spirit of the invention.

Figure 4:
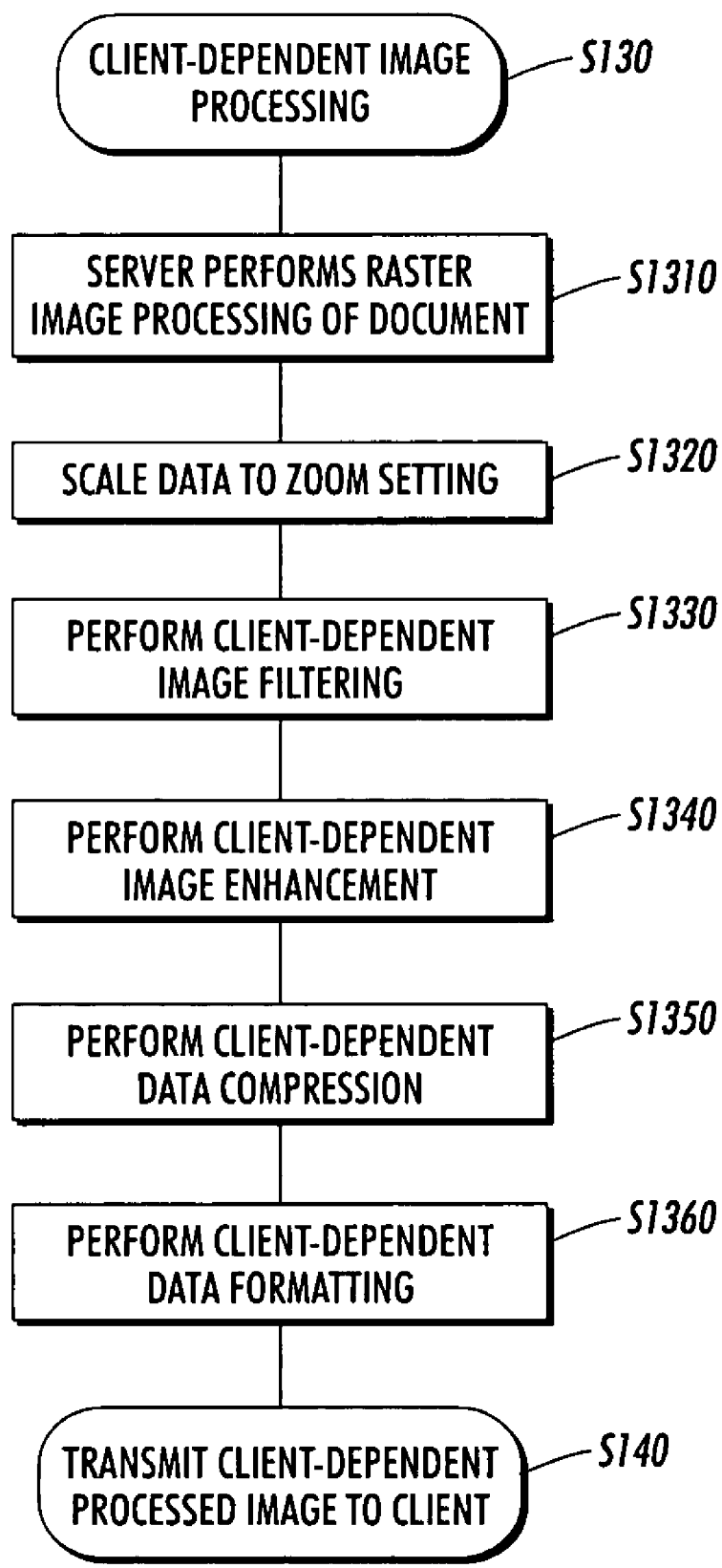
FIG. 4 is a flowchart outlining in greater detail one exemplary embodiment of various client dependent image processing operations performed by the server according to the method of FIG. 3.

FIG. 4 is a flowchart outlining in greater detail one exemplary embodiment of various client dependent image processing operations performed at step S130 by the server according to the method of FIG. 3. In various exemplary embodiments, the server based image processing operations include the steps of running the document application in order to create a data file that can be 'RiPped' into an image raster. All raster operations are then performed, such as, for example, rotation, scaling, cropping, enhancement, and the document image data is transformed into a client native format. For standard browser applications, this is either GIF, JPG or WBMP (WAP) format in the suitable size. In various exemplary embodiments, the server based image processing operations include the steps described in detail in U.S. patent application Ser. No. 10/901,241, now U.S. Pat. No. 7,620,892, entitled "Server Based Image Processing For Client Display of Documents", which is incorporated herein by references in its entirety.

As shown in FIG. 4, the client dependent image processing operations begin at step S130 and continue to step S1310 where the requested document is converted to a raster image on the server using well known raster image processing (RIP) techniques. This raster image generally uses some client capabilities, such as, for example, black and white rendering for a black and white device, and some document attributes, for example, lower initial resolution for PowerPoint documents compared to Word documents. The use of document attributes can be understood when considering the likelihood that certain document types will have certain properties. Presentation slides, for example, will have larger fonts and thus generally require a lower initial RIP resolution than legal documents.

Next, at step S1320, the 'RIPed' data is subsequently scaled to the desired zoom settings. For example, in various exemplary embodiments, the data may be scaled to one of the current prototype mDoc version 4 zoom settings, e.g., 2, 4, 8 and 16 reduction, using a density preserving reduction (filter & down sampling) leading to 5 raw images at the 5 different resolutions. The raw images may not yet adhere to the client color and bit-depth requirements.

Following data scaling, operation of the method continues to step S1330 where client-dependent image filtering is performed. At high reduction levels, the page content can only be "guessed" by the user. Twelve point text, for example, would be rendered at single pixel height for most letters. In various exemplary embodiments of the methods and systems according to this invention, the image sharpness is strongly increased for higher reduction factors, well above any limit that would be used for normal image viewing. However, increasing the sharpness at high reduction factors gives the user the perception of "text" without making the text readable. For the exemplary prototype mDoc application, speed is an important consideration as it directly influences user latency. As a speed/quality compromise, in one exemplary embodiment, a 5 element filter was chosen where four ring values are constant ("−1") and the center value is varied. Smaller center values yield stronger enhancement. Other techniques known in the art or later developed may also be used to perform client dependent filtering operations.

After image sharpening, at step S1340, enhancement TRCs are used to further increase the contrast of the data. The TRCs are a function of reduction factors (stronger enhancement for higher reductions) and of document applications. In this case, presentation slides and scanned data undergoes an essential symmetric contrast enhancement. Text documents and spreadsheets undergo a non-symmetric enhancement leading to a strong visual darkening. This is based on the likelihood that different color and foreground/background schemes are used in the different document types.

At step S1350, a data compression operation is performed. As part of the data compression operation, data compression parameters may be varied based on transmission bandwidth and client storage capabilities, as well as other factors. In the binary case, no variation can be obtained at this step directly, but rather a different enhancement can be performed. For color clients, a choice exists between JPEG and GIF compressions, since both are normally supported in the browser. In JPEG compression, the Q-table/Q-Factor can be used to change compression ratios. For the "GIF compression" (better in the GIF format encapsulated compression method), the compression efficiency may be modified by the initial color mapping. For the discussion presented below, a dynamic color mapping between "222" (8 colors) and "794" (252 colors) is assumed, as described in detail in U.S. patent application Ser. No. 10/901,333, entitled "Systems and Methods For Processing Image Data Prior To Compression", which is incorporated herein by reference in its entirety.

Following data compression, the method continues to step S1360 where a client dependent data formatting operation is performed. Following formatting of the data, the client dependent processed document/image is transmitted to the client device, step S140.

Table 1 is an exemplary embodiment of an image processing table showing the different image processing aspects as a function of reduction (zoom setting) and application. In Table 1, TRC name 64 L indicates a TRC that is non-symmetric ("L"eft) and that maps all pixel values below 64 to "black". A TRC name 32 indicates a symmetric TRC that maps all values below 32 to black and all values above 223 to white. The rest of the range is a linear mapping between black and white. The term "reduce" refers to a filtered subsampling, preferably maintaining image density attributes.

TABLE 1

|  | Word processor | Spreadsheet | Presentation | Scan |
|---|---|---|---|---|
| RIP Resolution | 150 | 150 | 75 | — |
| Scale Method | Reduce | Reduce | Reduce | Reduce |
| Zoom level | 1, 2, 3, 4 | 1, 2, 3, 4 | 1, 2, 3 | 1, 2, 3, 4 |
| Enhance Method | TRC stretching | TRC stretching | TRC stretching | TRC stretching |
| Enhance TRC For different scale factors Linear between: | 1 NO<br>2 32L<br>3 64L<br>4 100L | 1 NO<br>2 32L<br>3 64L<br>4 100L | 1 NO<br>2 32<br>3 50 | 1 32<br>2 50<br>3 64<br>4 64 |
| Filter method | 5 Element sharpen | 5 Element sharpen | 5 Element sharpen | 5 Element sharpen |
| Center Value | 1 NO<br>2 8<br>3 8<br>4 6 | 1 NO<br>2 8<br>3 8<br>4 6 | 1 NO<br>2 8<br>3 8 | 1 NO<br>2 8<br>3 8<br>4 6 |

As can be observed from Table 1, different image processing settings are used for different document types and zoom levels. The exemplary values given in Table 1 are currently used in an exemplary mDoc viewer demo produced by the inventors. For binary clients, such as for example, WAP phoned, processing stops at the level of Table 1, with only the file format conversion to WBMP being done after the image processing. For color capable clients, some additional steps, which are well known in the art, may be added.

FIG. 5 illustrates an example of the image quality that may be obtained using the various exemplary embodiments of the client-based image processing methods and systems according to this invention. The image on the left of FIG. 5, e.g., reference image 55, shows as reference the standard filtered subsampling. The reference image was done using a pre-filtered subsampling using the identical reduction algorithm as the one used in the exemplary methods and systems according to this invention.

The reference image shown on the right of FIG. 5, e.g., reference image 56, has been client-dependent processed using the various exemplary methods according to this invention. It will be noted that the image has not been cropped to the screen size. That is, FIG. 5 shows a different zoom level without cropping to the client window.

The client dependent image processing controls discussed above show a clear image quality improvement compared to standard, fixed processing. The processing overhead on a standard personal computer is small compared to the standard transmission times over the wireless network, and generally can be ignored. One possible exception to this may be the speed of the sharpness filter, leading to its omission for the largest images (full zoom).

Figure 6:
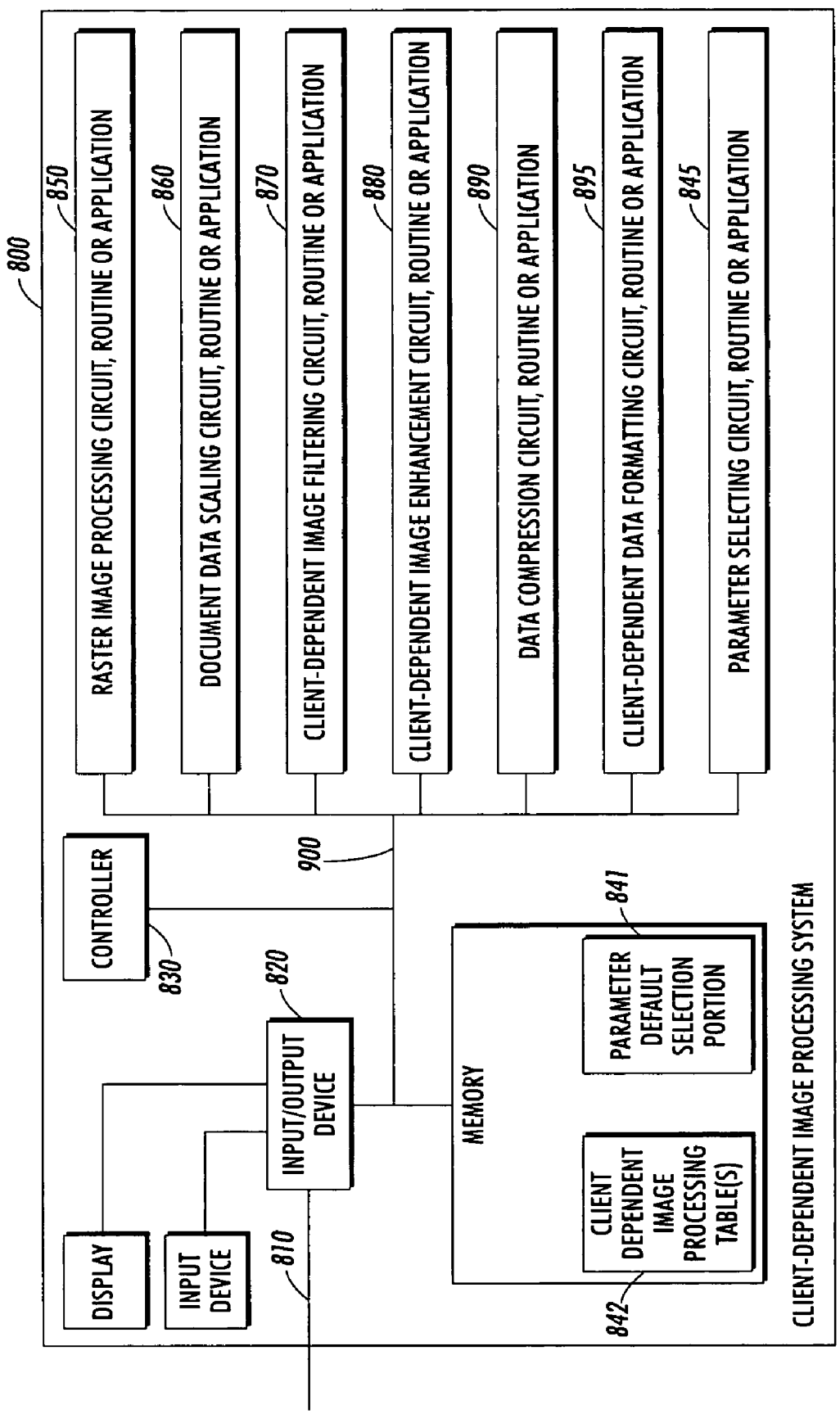
FIG. 6 is a functional block diagram of an exemplary embodiment of a client-based image processing system according to this invention.

FIG. 6 is a functional block diagram of an exemplary embodiment of a client dependent image processing system according to this invention. As shown in FIG. 6, the client dependent image processing system 800 typically resides in a server environment.

As shown in FIG. 6, the data processing system 800 may include an input/output (I/O) interface 820, a controller 830, a memory 840, a parameter selecting circuit, routine or application 845, an application library 847, a raster image processing circuit, routine or application 850, a document data scaling circuit, routine or application 860, a client dependent image filtering circuit, routine or application 870, a client-dependent image enhancement circuit, routine or application 880, a data compression circuit, routine or application 890, and a client dependent data formatting circuit, routine or application 895, each interconnected by one or more control and/or data buses and/or application programming interfaces 900.

In various exemplary embodiments, the data processing system 800 is implemented on a programmable general purpose computer. However, the data processing system 800 can also be implemented on a special purpose computer, a programmed microprocessor or microcontroller and peripheral integrated circuit elements, an ASIC or other integrated circuits, a digital signal processor (DSP), a hard wired electronic or logic circuit, such as a discrete element circuit, a programmable logic device such as a PLD, PLA, FPGA or PAL, or the like. In general, any device capable of implementing a finite state machine that is in turn capable of implementing the flowchart shown in FIGS. 3 and 4 can be used to implement the data processing system 800.

Figure 1:
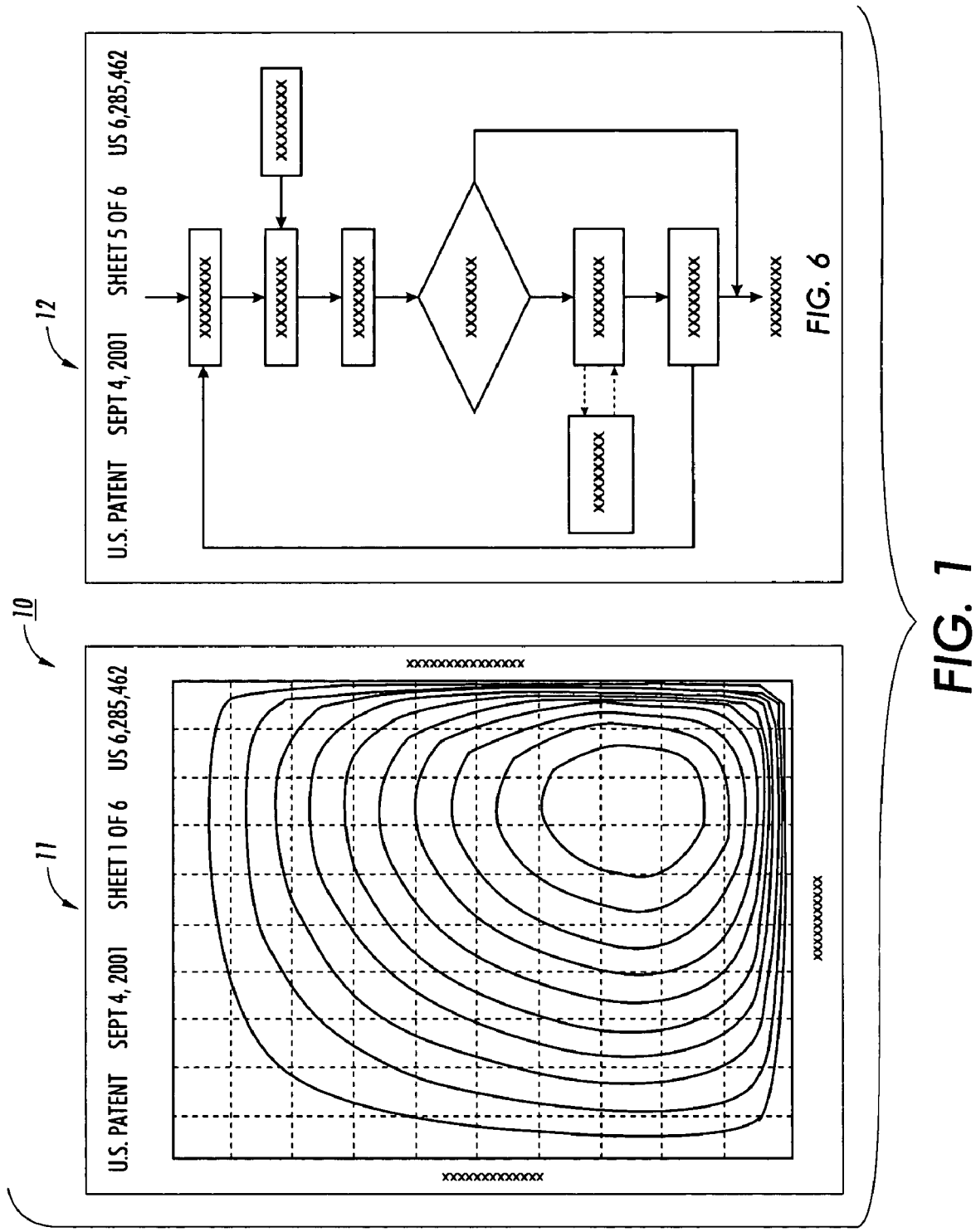
FIG. 1 illustrates an example patent document image showing the spatial organization of various text and graphics portions of the document.

The input/output interface 820 interacts with the outside of the data processing system 800. In various exemplary embodiments, the input/output interface 820 may receive input from the outside, such as a network, via one or more links 810. The input/output interface 820 may output data for subsequent delivery or transmission via the one or more links 810 to a client device (shown in FIG. 1).

The one or more links 810 may be direct connections, or may be implemented using a connection device such as a modem, a local area network, a wide area network, an intranet, the Internet, and any other distributed processing network, or any other known or later-developed connection device.

As shown in FIG. 6, the memory 840 includes a parameter default selection portion 841 and one or more client dependent image processing table(s) 842. The parameter default selection portion 841 stores default selections of parameters for client devices ("clients"). The parameter default selection portion 841 can also store parameters of various networks and display devices. The one or more client dependent image processing table(s) 842 stores different image processing settings that are used for different document types, zoom levels, and the like.

The memory 840 may also store any data and/or program necessary for implementing the functions of the data processing system 800. The memory 840 can be implemented using any appropriate combination of alterable, volatile, or non-volatile memory or non-alterable or fixed memory. The alterable memory, whether volatile or non-volatile, can be implemented using any one or more of static or dynamic RAM, a floppy disk and a disk drive, a writable or rewritable optical disk and disk drive, a hard drive, flash memory or the like. Similarly, the non-alterable or fixed memory can be implemented using any one or more of ROM, PROM, EPROM, EEPROM, an optical ROM disk, such as a CD-ROM or a DVD-ROM disk and disk drive or the like.

In the exemplary embodiments of the data processing system 800 shown in FIG. 6, the parameter selecting circuit, routine or application 845, under the control of controller 830, determines a selection of parameters. In various exemplary embodiments, the parameter selecting circuit, routine or application 845 determines the selection of parameters based on the specific characteristics of the client device, a user's instructions, a default selection stored in the memory 840, and/or detected features of the network, the client and/or the document type. In various exemplary embodiments, a detection may be made by detecting a network and/or device type, coupled with parameters stored for that network/device type. In various exemplary embodiments, different documents are processed differently. For example, a Word™ document is processed differently from a PowerPoint™ document, with the corresponding application files being rendered using appropriate application software from library 847. In various exemplary embodiments, different client devices process the same document differently.

The raster image processing circuit, routine or application 850, under the control of controller 830, converts a document requested by the client to a raster image on the server using well known raster image processing (RIP) techniques.

The document data scaling circuit, routine or application 860, under the control of controller 830, scales the 'RIPed' data to the desired zoom settings. For example, in various exemplary embodiments, the data may be scaled to one of the current prototype mDoc version 4 zoom settings, e.g., 2, 4, 8 and 16 reduction, using a density preserving reduction (filter & down sampling) leading to 5 raw images at the 5 different resolutions.

The client dependent image filtering circuit, routine or application 870, under the control of controller 830, performs client-dependent image filtering of the scaled data. In various exemplary embodiments of the methods and systems according to this invention, the image sharpness is strongly increased for higher reduction factors, well above any limit that would be used for normal image viewing.

The client-dependent image enhancement circuit, routine or application 880, under the control of controller 830, uses enhancement TRCs to further increase the contrast of the data.

Following image enhancement, the data compression circuit, routine or application 890, under the control of the controller 830, compresses the processed data. In various exemplary embodiments, the data compression circuit, routine or application 890 compresses the processed image data using tonal reproduction curves (TRC) to suppress backgrounds and to further enhance the perception of detail and optionally and/or custom color maps, as described in detail in U.S. patent application Ser. No. 10/901,333, now U.S. Pat. No. 7,539,341 entitled "System and Methods For Processing Image Data Prior to Compression", which is incorporated herein by reference in its entirety.

The client dependent data formatting circuit, routine or application 895, under the control of controller 830, finally formats the data prior to transmitting the data over the network to the client device. In various exemplary embodiments, the client dependent data formatting circuit, routine or application 895 formats the data based on one or more client dependent image processing table(s) 842. As discussed above, tables 842 store different image processing settings that are used for different document types, zoom levels, and the like.

While particular embodiments have been described, alternatives, modifications, variations and improvements may be implemented within the spirit and scope of the invention.

What is claimed is:

1. A method of processing data associated with a document requested by a client device from a server, the document being represented by image data, the image data having one or more data values and color levels, the method comprising:

predefining a set of relationships between zoom levels and tonal reproduction curves in one or more client dependent image processing tables;

automatically determining one or more parameters associated with at least one of a client device display and a data network for transmitting the image data from the server to the client device, based on a type and/or content of the document requested, the one or more parameters comprising an image data display zoom level requested by the client device; and processing image data by enhancing a contrast of the data values using a tonal reproduction curve based on the one or more parameters determined, the tonal reproduction curve being selected, based on the requested zoom level, from the predefined set of relationships stored in the one or more client dependent image processing tables, said processing being performed by the server prior to transmitting the image data to the client device.

2. The method of claim 1, wherein determining one or more parameters further comprises determining at least one of a client device display capability, a bandwidth of the data transmission network, a transmission speed of the network, and user-provided hints for displaying the image data.

3. The method of claim 1, wherein determining one or more parameters further comprises determining the one or more parameters dynamically.

4. The method of claim 1, wherein processing image data is dynamically modified according to one or more parameters associated with at least the client device display.

5. The method of claim 1, wherein processing the image data further comprises:
converting the requested document to a raster image using raster image processing techniques;
scaling the raster image to the requested zoom level; and
compressing the image data.

6. The method of claim 5, wherein said compressing step includes processing the image data to reduce the number of the color levels.

7. The method of claim 5, wherein processing the image data further comprises performing a filtering operation of the scaled raster image to increase an image sharpness of the scaled raster image.

8. The method of claim 1, further comprising transmitting the processed data associated with the image between the server and at least the client display device.

9. The method of claim 8, wherein transmitting the processed data comprises transmitting the processed data via a wireless network.

10. The method of claim 1, further comprising displaying the processed data associated with the image on the client device display.

11. The method of claim 10, wherein displaying the processed data comprises displaying the processed data on a handheld computing device or a mobile computing device.

12. A system to process data associated with a document requested by a client device from a server, the document being represented by image data, the image data having one or more data values and color levels, the system comprising a display device and controller that:
accesses a set of relationships between zoom levels and tonal reproduction curves that is predefined in one or more client dependent image processing tables;
automatically determines one or more parameters associated with at least one of a client device display and a data network for transmitting the image data from the server to the client device, device based on a type and/or content of the document requested, the one or more parameters comprising an image data display zoom level requested by the client device; and
processes image data by enhancing a contrast of the data values using a tonal reproduction curve based on the one or more parameters determined, the tonal reproduction curve being selected, based on requested zoom level, from the predefined set of relationships stored in the one or more client dependent image processing tables, said processing being performed by the server prior to transmitting the image data to the client device.

13. The system of claim 12, wherein the controller determines the one or more parameters further based on at least one of a client device display capability, a bandwidth of the data transmission network, a transmission speed of the network, and user-provided hints for displaying the image data.

14. The system of claim 12, wherein the controller determines the one or more parameters dynamically.

15. The system of claim 12, wherein the controller dynamically modifies image data according to one or more parameters associated with at least the client device display.

16. The system of claim 12, the controller further processing the image data by:
converting the requested document to a raster image using raster image processing techniques;
scaling the raster image to the requested zoom level; and
compressing the image data by performing color mapping to reduce the number of the color levels.

17. The system of claim 16, wherein said compressing includes processing the image data to reduce the number of the color levels.

18. The system of claim 16, the controller further processing the image data by performing a filtering operation of the scaled raster image to increase an image sharpness of the scaled raster image.

19. The system of claim 12, the controller further transmitting the processed data associated with the image between the server and at least the client display device.

20. The system of claim 19, wherein transmitting the processed data comprises transmitting the processed data via a wireless network.

21. The system of claim 12, the controller further displaying the processed data associated with the image on the client device display.

22. The system of claim 21, wherein displaying the processed data comprises displaying the processed data on a handheld computing device or a mobile computing device.

23. A machine-readable medium that provides instructions for processing data associated with a document requested by a client device from a server, the document being represented by image data, the image data having one or more data values and color levels, the instructions, when executed by a processor, causing the processor to perform operations comprising:
accessing a set of relationships between zoom levels and tonal reproduction curves that is predefined in one or more client dependent image processing tables;
automatically determining one or more parameters associated with at least one of a client device display and a data network for transmitting the image data from the server to the client device, device based on a type and/or content of the document requested, the one or more parameters comprising an image data display zoom level requested by the client device; and
processing image data by enhancing a contrast of the data values using a tonal reproduction curve based on the one or more parameters determined, the tonal reproduction curve being selected, based on the requested zoom level, from the predefined set of relationships stored in the one or more client dependent image processing tables, said processing being performed by the server prior to transmitting the image data to the client device.

24. The machine-readable medium of claim 23, wherein determining one or more parameters further comprises determining at least one of a client device display capability, a bandwidth of the data transmission network, a transmission speed of the network, and user-provided hints for displaying the image data.

25. The machine-readable medium of claim 23, wherein the processing of the image data is dynamically modified according to one or more parameters associated with at least the client device display.

26. The machine-readable medium of claim 23, wherein processing of the image data further comprises:
   converting the requested document to a raster image using raster image processing techniques;
   scaling the raster image to the requested zoom level; and
   compressing the image data.

27. The machine-readable medium of claim 23, wherein said compressing includes processing the image data to reduce the number of the color levels.

28. The machine-readable medium of claim 23, wherein processing the image data further comprises performing a filtering operation of the scaled raster image to increase an image sharpness of the scaled raster image.

* * * * *